United States Patent
Lee et al.

(10) Patent No.: US 9,318,111 B2
(45) Date of Patent: Apr. 19, 2016

(54) VOICE RECOGNITION CLIENT SYSTEM FOR PROCESSING ONLINE VOICE RECOGNITION, VOICE RECOGNITION SERVER SYSTEM, AND VOICE RECOGNITION METHOD

(75) Inventors: Sang Ho Lee, Seongnam-si (KR); Hoon Kim, Seongnam-si (KR); Dong Ook Koo, Seongnam-si (KR); Jun Seok Kim, Seongnam-si (KR); Sang Kyong Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 189 days.

(21) Appl. No.: 13/995,085

(22) PCT Filed: Jul. 21, 2011

(86) PCT No.: PCT/KR2011/005394
§ 371 (c)(1),
(2), (4) Date: Nov. 25, 2013

(87) PCT Pub. No.: WO2012/081788
PCT Pub. Date: Jun. 21, 2012

(65) Prior Publication Data
US 2014/0316776 A1    Oct. 23, 2014

(30) Foreign Application Priority Data
Dec. 16, 2010 (KR) .................... 10-2010-0129217

(51) Int. Cl.
*G10L 15/22* (2006.01)
*G10L 15/30* (2013.01)
(Continued)

(52) U.S. Cl.
CPC .................. *G10L 15/22* (2013.01); *G10L 15/01* (2013.01); *G10L 15/08* (2013.01); *G10L 15/30* (2013.01); *G10L 2015/221* (2013.01)

(58) Field of Classification Search
CPC .... G10L 15/02; G10L 2015/221; G10L 15/30
USPC ......... 704/231, 227, 234, 235, 224, 240, 260, 704/254
See application file for complete search history.

(56) References Cited

U.S. PATENT DOCUMENTS

2002/0165719 A1* 11/2002 Wang et al. ................. 704/270.1
2003/0182113 A1*  9/2003 Huang .......................... 704/231
(Continued)

FOREIGN PATENT DOCUMENTS

JP    2004-094077    3/2004
JP    2005-037615    2/2005
(Continued)

OTHER PUBLICATIONS

International Search Report issued on Feb. 27, 2012 in PCT/KR2011/005394.

*Primary Examiner* — Eric Yen
(74) *Attorney, Agent, or Firm* — Greer Burns & Crain Ltd.

(57) ABSTRACT

A voice/speech recognition client system, a voice recognition server system, and a voice recognition method. The voice recognition system indicates a result of voice recognition in a voice signal inputted from a starting time for voice recognition to an ending time. The voice recognition client comprises: a communication unit that transmits a unit voice signal input at intervals from the starting time to the ending time, to the voice recognition server system at the intervals and receives an intermediate result of voice recognition from the voice recognition server system; and a display unit that displays the intermediate result received between the starting time and the ending time.

13 Claims, 9 Drawing Sheets

(51) Int. Cl.
   *G10L 15/08*   (2006.01)
   *G10L 15/01*   (2013.01)

(56) References Cited

U.S. PATENT DOCUMENTS

| | | | |
|---|---|---|---|
| 2005/0114129 A1* | 5/2005 | Watson et al. | 704/235 |
| 2006/0136218 A1* | 6/2006 | Lee | G10L 15/285 704/270.1 |
| 2007/0239837 A1* | 10/2007 | Jablokov et al. | 709/206 |
| 2009/0228274 A1* | 9/2009 | Terrell, II | G10L 15/22 704/235 |
| 2009/0240488 A1* | 9/2009 | White et al. | 704/9 |
| 2010/0057451 A1* | 3/2010 | Carraux | G10L 15/30 704/231 |
| 2012/0084089 A1* | 4/2012 | Lloyd | G10L 15/20 704/500 |

FOREIGN PATENT DOCUMENTS

| | | |
|---|---|---|
| JP | 2005-283972 | 10/2005 |
| JP | 2005-331616 | 12/2005 |
| JP | 2010-048890 | 3/2010 |
| JP | 2010-085536 | 4/2010 |
| WO | WO 2009/035842 A1 | 3/2009 |

* cited by examiner

VOICE RECOGNITION CLIENT SYSTEM FOR PROCESSING ONLINE VOICE RECOGNITION, VOICE RECOGNITION SERVER SYSTEM, AND VOICE RECOGNITION METHOD

CROSS-REFERENCE TO RELATED APPLICATIONS

This application is the National Stage Entry of International Application PCT/KR2011/005394, filed on Jul. 21, 2011, and claims priority from and the benefit of Korean Patent Application No. 10-2010-0129217, filed on Dec. 16, 2010, both of which are incorporated herein by reference in their entireties for all purposes as if fully set forth herein.

BACKGROUND OF THE INVENTION

1. Field

The present invention relates to a speech recognition client system, speech recognition server system, and speech recognition method for processing online speech recognition.

2. Discussion of the Background

Speech recognition refers to identifying linguistic semantic content in a speech using an automatic means, and in particular, a processing process of inputting a speech waveform, identifying a work or a word sequence, and extracting a meaning.

In a conventional technology using such speech recognition, when an action of speaking is completed by a user, a result of speech recognition may be generated using the entire input sound signal. For example, in a speech search service using speech recognition, a search may be conducted using a result of speech recognition generated after an action of speaking is fully completed by the user, and a result of the search may be provided.

However, with such a conventional technology, the user may input the entire sound signal with respect to a word or sentence so as to input an intended word or sentence, and await generation of a result of speech recognition with respect to the entire sound signal. Accordingly, while the speech recognition is being performed, the user may only wonder whether the speech recognition is performed properly.

Herein, a system and method that may perform speech recognition more effectively will be provided.

SUMMARY

An aspect of the present invention provides a speech recognition client system, a speech recognition server system, and a speech recognition method that may provide a user with an intermediate result of speech recognition after the user starts speaking and before the speech recognition is terminated, thereby reducing an anxiety of the user about whether the speech recognition is performed accurately, and performing the speech recognition more accurately.

Another aspect of the present invention provides a speech recognition client system, a speech recognition server system, and a speech recognition method that may generate a partial sound signal by accumulating at least one unit sound signal input at intervals of a predetermined unit time after a user starts speaking, generate an intermediate result of speech recognition based on the partial sound signal, and provide the user with the intermediate result of the speech recognition, thereby reassuring the user and showing a processing process of the speech recognition.

According to an aspect of the present invention, there is provided a speech recognition client system for displaying a result of speech recognition with respect to a sound signal input starting from a starting time until an ending time of the speech recognition, the speech recognition client system including a communication unit to transmit, to a speech recognition server system, a unit sound signal input at intervals of a predetermined unit time starting from the starting time until the ending time, at intervals of the predetermined unit time, and to receive an intermediate result of the speech recognition from the speech recognition server system, and a display unit to display the received intermediate result of the speech recognition between the starting time and the ending time.

The intermediate result of the speech recognition may be generated by the speech recognition server system, using a partial sound signal generated by accumulating at least one unit sound signal based on an input time.

The display unit may sequentially display a plurality of intermediate results of the speech recognition between the starting time and the ending time when the plurality of intermediate results of the speech recognition is received from the speech recognition server system.

When at least two results are included in a single intermediate result of the speech recognition, the display unit may display all of the at least two results.

The speech recognition client system may further include a user interface unit to receive an input of an event from a user. When one of at least two results being displayed is selected through the event, the selected result may be fed back to the speech recognition server system and reflected in a process of the speech recognition.

The speech recognition client system may further include an accuracy determining unit to determine respective accuracies of at least two results when at least two results are included in the intermediate result of the speech recognition. In this instance, the display unit may display the at least two results in an order of accuracy, or display a result with a highest accuracy.

The speech recognition client system may further include a feature information extracting unit to extract feature information from the input unit sound signal, and an encoding unit to encode the input unit sound signal. In this instance, the communication unit may transmit, to the speech recognition server system, the extracted feature information and the encoded unit sound signal as the input unit sound signal.

According to another aspect of the present invention, there is also provided a speech recognition server system for generating a result of speech recognition using a sound signal received from a speech recognition client system, the speech recognition server system including a receiving unit to receive a unit sound signal input into the speech recognition client system at intervals of a unit time starting from a starting time until an ending time of the speech recognition, a speech recognition result generating unit to generate an intermediate result of the speech recognition, using a partial sound signal generated by accumulating at least one unit sound signal based on an input time, and a transmitting unit to transmit the intermediate result of the speech recognition to the speech recognition client system. In this instance, the intermediate result of the speech recognition may be displayed through a display unit of the speech recognition client system between the starting time and the ending time.

According to still another aspect of the present invention, there is also provided a speech recognition client system for displaying a result of speech recognition with respect to a sound signal input starting from a starting time until an ending time of the speech recognition, the speech recognition client system including a control unit to control an intermediate result of the speech recognition with respect to a partial sound signal input starting from the starting time until at least one of a plurality of points in time between the starting time and the ending time, to be displayed between the starting time and the ending time.

According to yet another aspect of the present invention, there is also provided a speech recognition server system for generating a result of speech recognition using a sound signal received from a speech recognition client system, the speech recognition server system including a speech recognition result generating unit to generate an intermediate result of the speech recognition, using a partial sound signal input into the speech recognition client system starting from a starting time of the speech recognition until at least one of a plurality of points in time between the starting time and an ending time, and a transmitting unit to transmit the intermediate result of the speech recognition to the speech recognition client system. In this instance, the intermediate result of the speech recognition may be displayed through a display unit of the speech recognition client system between the starting time and the ending time.

According to further another aspect of the present invention, there is provided a speech recognition method of displaying a result of speech recognition with respect to a sound signal input starting from a starting time until an ending time of the speech recognition, the speech recognition method including transmitting, to a speech recognition server system, a unit sound signal input at intervals of a predetermined unit time starting from the starting time until the ending time, at intervals of the predetermined unit time, and receiving an intermediate result of the speech recognition from the speech recognition server system, and displaying the received intermediate result of the speech recognition between the starting time and the ending time.

According to still another aspect of the present invention, there is also provided a speech recognition method of generating a result of speech recognition using a sound signal received from a speech recognition client system, the speech recognition method including receiving a unit sound signal input into the speech recognition client system at intervals of a unit time starting from a starting time until an ending time of the speech recognition, generating an intermediate result of the speech recognition using a partial sound signal generated by accumulating at least one unit sound signal based on an input time, and transmitting the intermediate result of the speech recognition to the speech recognition client system. In this instance, the intermediate result of the speech recognition may be displayed through a display unit of the speech recognition client system between the starting time and the ending time.

According to yet another aspect of the present invention, there is also provided a speech recognition method of displaying a result of speech recognition with respect to a sound signal input starting from a starting time until an ending time of the speech recognition, the speech recognition method including controlling an intermediate result of the speech recognition with respect to a partial sound signal input starting from the starting time until at least one of a plurality of points in time between the starting time and the ending time, to be displayed between the starting time and the ending time.

According to still another aspect of the present invention, there is also provided a speech recognition method of generating a result of speech recognition using a sound signal received from a speech recognition client system, the speech recognition method including generating an intermediate result of the speech recognition using a partial sound signal input into the speech recognition client system starting from a starting time until at least one of a plurality of points in time between the starting time and an ending time, and transmitting the intermediate result of the speech recognition to the speech recognition client system. In this instance, the intermediate result of the speech recognition may be displayed through a display unit of the speech recognition client system between the starting time and the ending time.

According to exemplary embodiments of the present invention, it is possible to reduce an anxiety of a user about whether speech recognition is performed accurately and to perform the speech recognition more accurately, by providing the user with an intermediate result of the speech recognition after the user starts speaking and before the speech recognition is terminated.

According to exemplary embodiments of the present invention, it is possible to reassure a user and to show a processing process of speech recognition, by generating a partial sound signal by accumulating at least one unit sound signal input at intervals of a predetermined unit time after a user starts speaking, generating an intermediate result of the speech recognition based on the partial sound signal, and providing the user with the intermediate result of the speech recognition.

DETAILED DESCRIPTION OF THE ILLUSTRATED EMBODIMENTS

Figure 1:
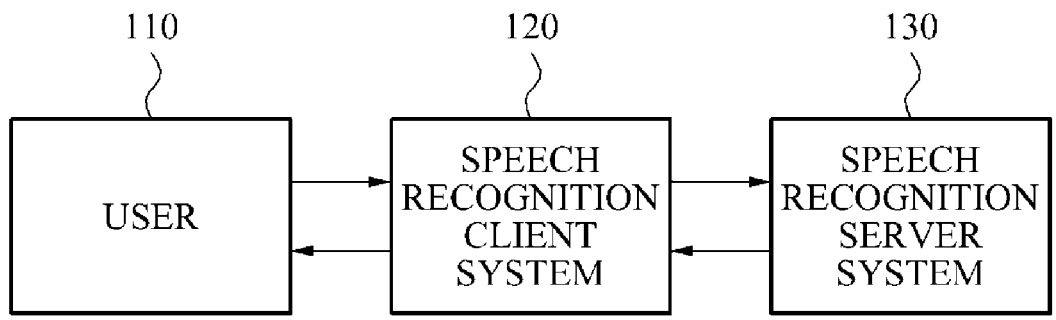
FIG. 1 is a diagram illustrating an overall system configured for online speech recognition according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an overall system configured for online speech recognition according to an exemplary embodiment of the present invention. In FIG. 1, a user 110, a speech recognition client system 120, and a speech recognition server system 130 are illustrated.

Here, the speech recognition client system 120 may be a terminal of the user 110 or a single module included in the terminal. In this instance, when the user 110 inputs a speech through the speech recognition client system 120, the speech recognition client system 120 may extract features of the input speech. The speech recognition client system 120 may transfer the extracted features to the speech recognition server system 130, and the speech recognition server system 130 may generate a result of speech recognition by performing the speech recognition using the received features. The speech recognition server system 130 may transfer the generated result of the speech recognition to the speech recognition client system 120, and the speech recognition client system 120 may display the result of the speech recognition using a display apparatus, and the like. In doing so, the user 110 may be provided with the result of the speech recognition with respect to the speech input by the user 110.

In this instance, the speech recognition client system 120 and the speech recognition server system 130 may provide a result of speech recognition with respect to the entire sound signal input after speaking is fully completed by the user 110. In addition, the speech recognition client system 120 and the speech recognition server system 130 may provide an intermediate result of speech recognition with respect to a sound signal input at intervals of a predetermined unit time after the user 110 starts speaking and until a point in time at which the user 110 resumes speaking. For example, the user 110 may be provided with an intermediate result of the speech recognition every 1 second or every 0.5 seconds subsequent to a period of about 1 second after the user 110 starts speaking.

In particular, the speech recognition client system 120 may transmit a sound signal input every 20 milliseconds to the speech recognition server system 130, and the speech recognition server system 130 may recognize a speech using a speech recognizer, and return an intermediate result of speech recognition every 500 milliseconds. In this instance, the speech recognition client system 120 may provide the user 110 with the received intermediate result of the speech recognition, by displaying the intermediate result of the speech recognition on a screen.

As described above, by showing the user 110 the process of performing the speech recognition, the user 110 may be reassured. Here, one of candidate intermediate results of speech recognition may be suggested to the user 110. In particular, when the user 110 who wants to obtain a result of speech recognition corresponding to "구스타프 클림트 (GUSTAV KLIMT)" (phonetic symbols followed by pronunciation in parenthesis) says "구 (GU)", the speech recognizer may select a result with a highest degree of correspondence thus far from among "9 (GU)", "구 (GU)", "코 (KO)", and "G", and transmit a selected candidate result, for example "9 (GU)", to a client. Although "9 (GU)" may be displayed to the user 110 at that time, the displayed result may be changed to "구 (GU)" later based on a subsequent speech. Such a process may be repeated until a final result of the speech recognition is displayed.

In addition, when it is determined that the speech recognition is completed, the speech recognition server system 130 may transmit a final result of the speech recognition to the speech recognition client system 120, using the entire transmitted sound signal. In this instance, the speech recognition client system 120 may display the final result of the speech recognition, thereby providing the final result of the speech recognition to the user 110.

Further, when a result intended by the user 110 is included in the intermediate result of the speech recognition, the user 110 may generate an event in the speech recognition client system 120 to select an ending time of the speech recognition. For example, although speaking is completed by the user 110, the speech recognition may continue due to ambient noise. In this instance, an inaccurate result of the speech recognition may be generated, and an amount of time expended for the speech recognition may increase. Accordingly, when a preset event is generated by the user 110, the speech recognition client system 120 may control the speech recognition to be terminated. In this instance, the speech recognition client system 120 and the speech recognition server system 130 may generate a final result of the speech recognition, using a sound signal input until the speech recognition is terminated.

The final result of the speech recognition may be used as a user input, for example, a search query.

Figure 2:
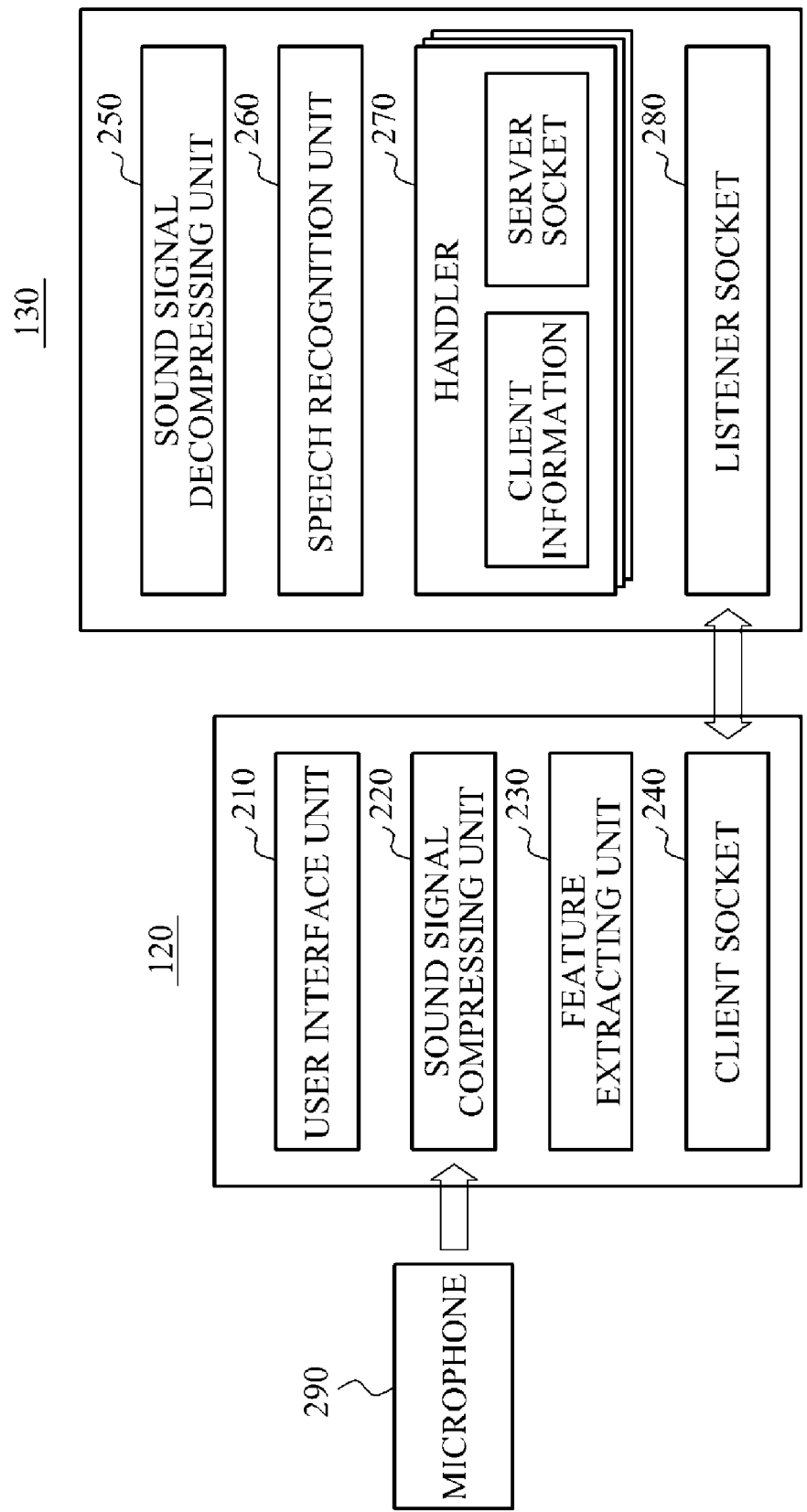
FIG. 2 is a block diagram illustrating a functional structure of a speech recognition client system and a functional structure of a speech recognition server system according to an exemplary embodiment of the present invention.

FIG. 2 is a block diagram illustrating a functional structure of a speech recognition client system and a functional structure of a speech recognition server system according to an exemplary embodiment of the present invention. In particular, FIG. 2 illustrates an internal configuration of the speech recognition client system 120 and an internal configuration of the speech recognition server system 130 of FIG. 1. Referring to FIG. 2, the speech recognition client system 120 may include a user interface unit 210, a sound signal compressing unit 220, a feature extracting unit 230, and a client socket 240, and the speech recognition server system 130 may include a sound signal decompressing unit 250, a speech recognition unit 260, a handler 270, and a listener socket 280.

The user interface unit 210 may include an input interface configured to receive an input of an event from a user, and a display apparatus configured to display at least one result of speech recognition. In particular, the user interface unit 210 may include an interface configured to receive an input of an event from the user, or to display a result of speech recognition to the user.

When the speech recognition is initiated, using the user interface unit 210, the sound signal compressing unit 220 may receive and record an input of a sound signal input through a microphone 290. For example, the sound signal compressing unit 220 may receive an input of a mono sound signal at 16 kilohertz (KHz).

In this instance, the feature extracting unit 230 may extract features from the sound signal. Since methods of extracting features from a sound signal, for example, a speech of a user, are already well-known, a detailed description will be omitted herein. In particular, one of the various well-known methods may be employed for extracting the features.

In addition, the sound signal compressing unit 220 may encode data to be transmitted to the speech recognition server system 130. In particular, the features extracted by the feature extracting unit 230 and the sound signal recorded by the sound signal compressing unit 220 may be encoded.

In this instance, the speech recognition client system 120 may extract features from a sound signal input at intervals of a unit time starting from a point in time at which the speech recognition is initiated, or when a predetermined period of time passes after the speech recognition is initiated, encode the extracted features and the sound signal, and transmit the encoded features and sound signal to the speech recognition server system 130.

The sound signal decompressing unit 250 of the speech recognition server system 130 may decompress the compressed sound signal included in a packet received from the speech recognition client system 120.

The speech recognition unit 260 may obtain linguistic data using the decompressed sound signal.

The handler 270 may include client information about the speech recognition client system 120 accessing the speech recognition server system 130, and a server socket corresponding to a socket accessed by the speech recognition client system 120. In this instance, the handlers 270 may be generated for a plurality of speech recognition client systems accessing the speech recognition server system 130, respectively.

The listener socket 280 may include a socket waiting for an access request from the speech recognition client system 120.

In this instance, the speech recognition server system 130 may use a multi-thread in order for the plurality of speech client systems to utilize resources efficiently.

In particular, as described above, the speech recognition client system 120 and the speech recognition server system 130 may provide a user with an intermediate result of speech recognition. The speech recognition client system 120 may transfer a sound signal input at intervals of a unit time to the speech recognition server system 130, and the speech recognition server system 130 may transfer an intermediate result of the speech recognition generated at intervals of another unit time to the speech recognition client system 120. In this instance, the speech recognition client system 120 may display the transferred intermediate result of the speech recognition to the user. Accordingly, the user may notice that the process of the speech recognition is in progress, and be reassured.

In addition, the user interface unit 210 of the speech recognition client system 120 may receive an event for determining an ending time of the speech recognition from the user. In this instance, the speech recognition client system 120 may terminate the speech recognition, and may regard an intermediate result of the speech recognition with respect to a sound signal input until the speech recognition is terminated, as a final result.

Figure 3:
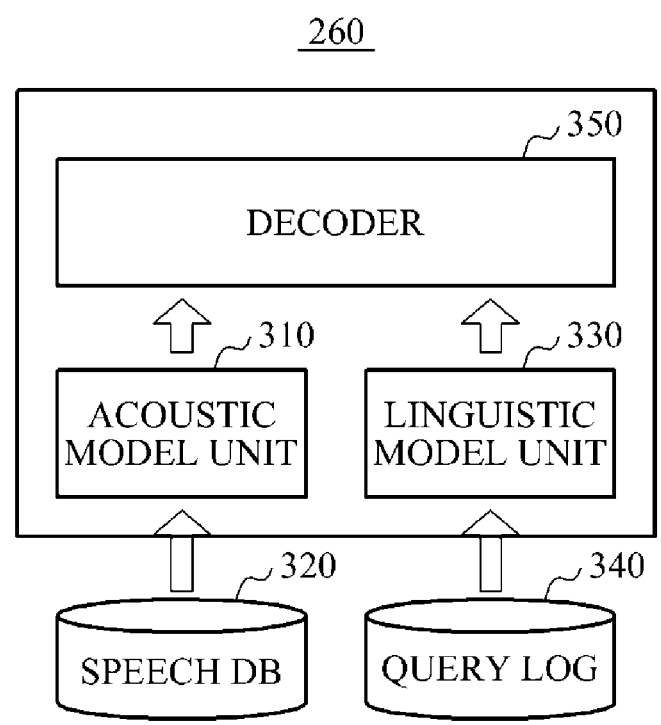
FIG. 3 is a block diagram illustrating an internal configuration of a speech recognition unit according to an exemplary embodiment of the present invention.

FIG. 3 is a block diagram illustrating an internal configuration of a speech recognition unit according to an exemplary embodiment of the present invention. In particular, as shown in FIG. 3, the speech recognition unit 260 of FIG. 2 may include an acoustic model unit 310, a linguistic model unit 330, and a decoder 350. In addition, a speech database 320 and a query log 340 of FIG. 3 may be included in the speech recognition unit 260 or be linked to the speech recognition unit 260 to provide data to the speech recognition unit 260.

The acoustic model unit 310 of the speech recognition unit 260 may propose a matching value between a received feature and a recognized unit word. Here, the acoustic model unit 310 may employ a method of generating unit word models from the speech database 320 constructed in advance, and a method of calculating a matching level between the unit word models and the received feature. Such a method of generating a unit word model and a matching method may be performed using one of various well-known methods.

The linguistic model unit 330 may construct a linguistic model. For example, a bigram model or a trigram model may be used to construct the linguistic model. Methods of constructing a linguistic model are already well-known and thus, a detailed description will be omitted herein. In this instance, the query log 340 may be used as a text database to be used for constructing the linguistic model. Here, the query log 340 may include a user query log input for a search service.

The decoder 290 may generate a result of speech recognition using an output of the acoustic model unit 310 and an output of the linguistic model unit 330. The generated result of the speech recognition may be transmitted to the speech recognition client system 120 described with reference to FIGS. 1 and 2.

In particular, when the speech recognition client system 120 transmits features and a sound signal input at intervals of a unit time, the speech recognition server system 130 may generate a result of speech recognition using the received features and sound signal, at intervals of another unit time. In this instance, the speech recognition server system 130 may transmit the generated result of the speech recognition to the speech recognition client system 120, and the speech recognition client system 120 may display the received result of the speech recognition, sequentially, while the speech recognition is in progress. Accordingly, the user may notice that the speech recognition is in progress, and be reassured.

In the following, Table 1 shows intermediate results of speech recognition and a final result of the speech recognition provided while a user is inputting "정자역에서 강남역까지 가는 버스 (JEONGJAYEOK ESEO GANNAMYEOK KKAJI GANUN BUS [BUS FROM JEONGJA STATION TO GANGNAM STATION])" (phonetic symbols followed by pronunciation in parenthesis). In Table 1, a sequence denotes a sequence in which the results of the speech recognition are provided.

TABLE 1

| Sequence | Results (phonetic symbols followed by pronunciation in parenthesis) |
|---|---|
| 1 | 2 (EE) |
| 2 | 정 (JEONG) |
| 3 | 정재민 (JEONG JAE MIN) |
| 4 | 정자역에서 (JEONGJAYEOK ESEO [FROM JEONGJA STATION]) |
| 5 | 정자역에서 강남역 (JEONGJAYEOK ESEO GANNAMYEOK [FROM JEONGJA STATION TO GANGNAM STATION]) |
| 6 | 정자역에서 강남역 갈시간 (JEONGJAYEOK ESEO GANNAMYEOK GAL SIGAN [TIME FROM JEONGJA STATION TO GANGNAM STATION]) |
| 7 | 정자역에서 강남역까지 가는 버스 (JEONGJAYEOK ESEO GANNAMYEOK KKAJI GANUN BUS [BUS FROM JEONGJA STATION TO GANGNAM STATION]) |

Figure 4:
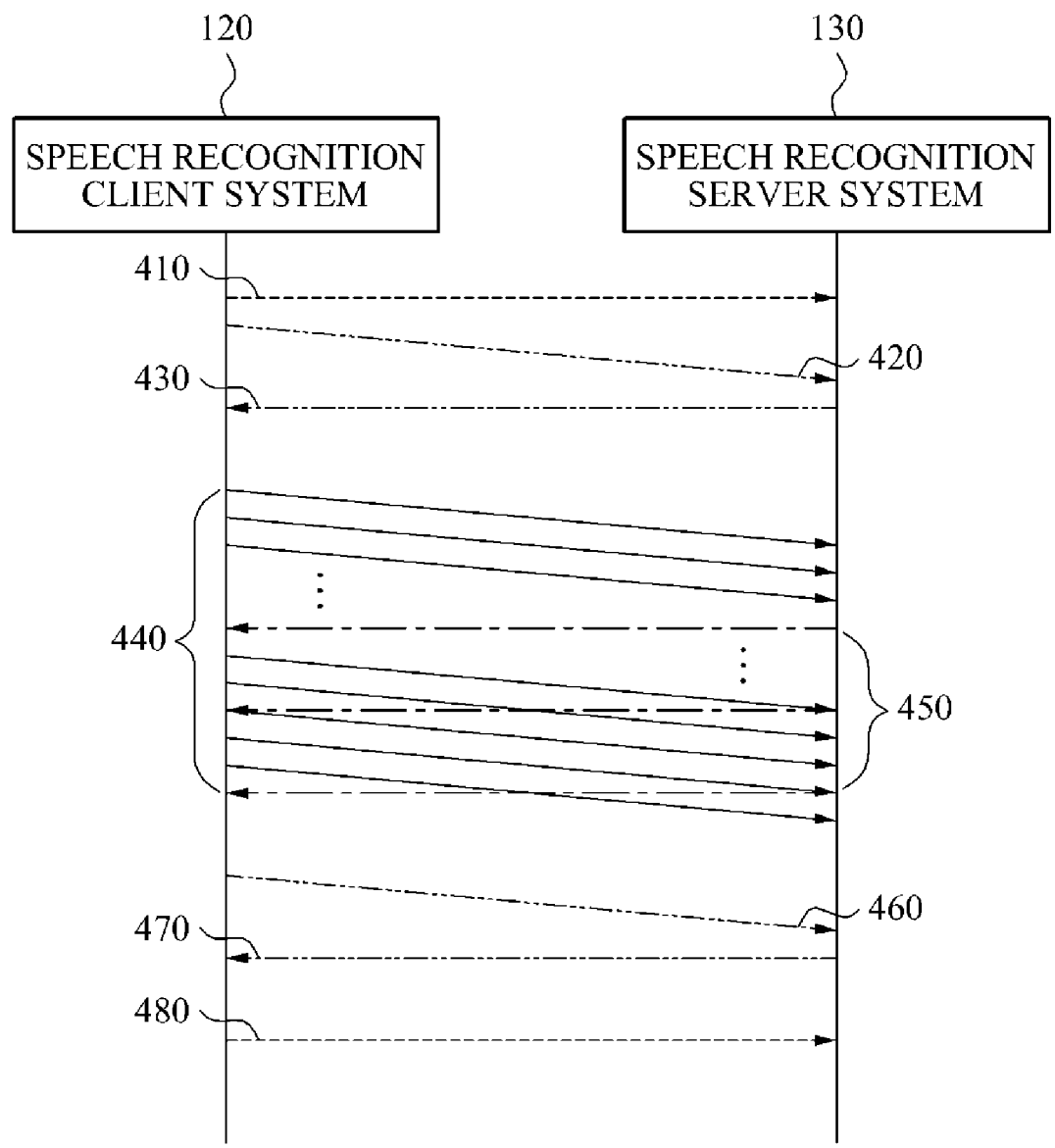
FIG. 4 is a diagram illustrating a process of speech recognition according to an exemplary embodiment of the present invention.

FIG. 4 is a diagram illustrating a process of speech recognition according to an exemplary embodiment of the present invention.

A first dashed line 410 indicates a process of the speech recognition client system 120 accessing the speech recognition server system 130. For example, a transmission control protocol/Internet protocol (TCP/IP) may be used for the access. A first dashed double-dotted line 420 indicates that the speech recognition client system 120 may provide a first control packet, for example, protocol version information and terminal information, to the speech recognition server system 130. A second dashed double-dotted line 430 indicates that the speech recognition server system 130 may provide a first response packet with respect to the first control packet to the speech recognition client system 120.

Solid lines within a first range 440 indicate that the speech recognition client system 120 may provide packets including sound signals at intervals of a unit time to the speech recognition server system 130. For example, the speech recognition client system 120 may transmit, to the speech recognition server system 130, a packet including a sound signal input thus far, every 20 milliseconds.

Dashed dotted lines within a second range 450 indicate that the speech recognitions server system 130 may provide intermediate result of the speech recognition generated at intervals of another unit time and a final result of the speech recognition to the speech recognition client system 120. For example, the speech recognition server system 130 may generate an intermediate result of speech information using a partial sound signal generated by accumulating sound signals received thus far, every 500 milliseconds, and transmit the generated intermediate result of the speech information to the speech recognition client system 130. In addition, when a final result is obtained from the speech recognition unit 260 of FIG. 2, the speech recognition server system 130 may generate a final result of the speech recognition and transmit the generated final result of the speech recognition to the speech recognition client system 130. In this instance, when the speech recognition is terminated, the speech recognition server system 130 may discard packets including the sound signals received thus far.

A third dashed double-dotted line 460 indicates that the speech recognition client system 120 may transmit a second control packet to the speech recognition server system 130, thereby notifying an access termination. In addition, a fourth dashed double-dotted line 470 indicates that the speech recognition server system 130 may transmit a second response packet with respect to the first control packet to the speech recognition client system 120, thereby acknowledging receipt of the notification of the access termination.

A second dashed line 480 indicates that the speech recognition client system 120 may cancel the access to the speech recognition server system 130.

In this instance, the packets used in the example of FIG. 4, respectively, may basically include a header and a payload. Here, the header may be compulsory, and the payload may be optional. In particular, a payload may be included in a packet optionally depending on a type of the packet.

Figure 5:
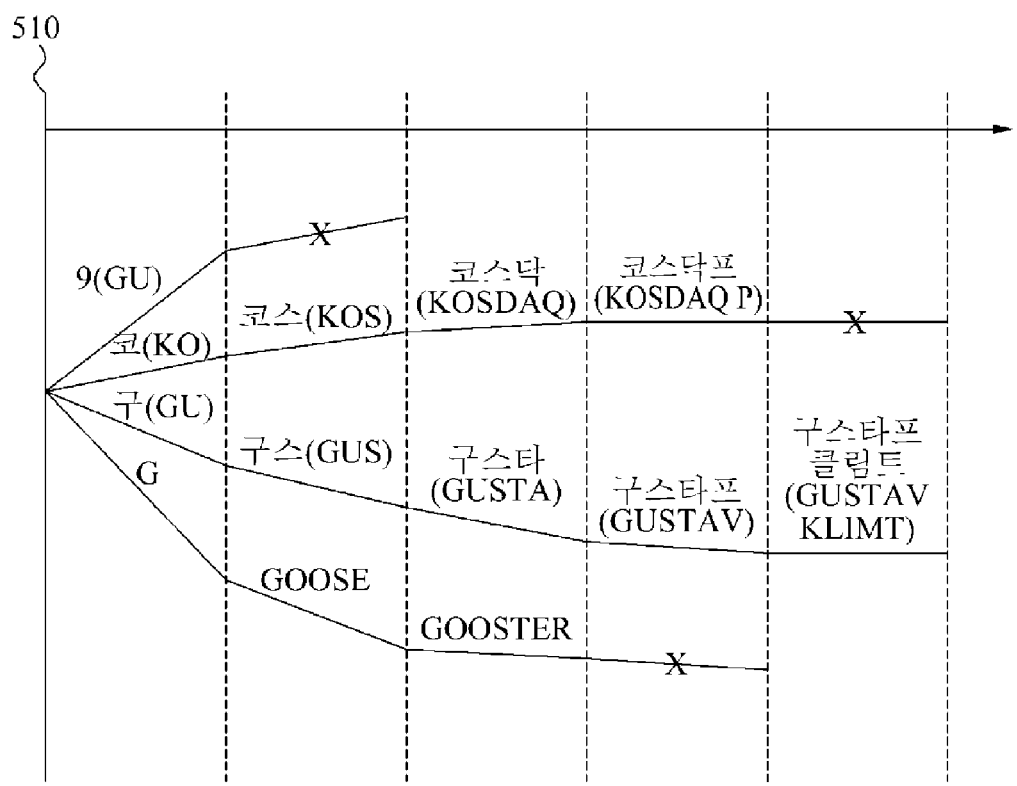
FIG. 5 is a diagram illustrating a result of speech recognition according to time in a process of the speech recognition according to an exemplary embodiment of the present invention.

FIG. 5 is a diagram illustrating a result of speech recognition according to time in a process of the speech recognition according to an exemplary embodiment of the present invention. A graph 500 shows an intermediate process of speech recognition generated over time corresponding to a horizontal axis when a user wants to input a speech of "GUSTAV KLIMT." In the present exemplary embodiment, an example of providing intermediate results of the speech recognition being provided at intervals of a unit time starting from a starting time 510 of the speech recognition is provided. For ease of description, it may be assumed that a single syllable of a sound signal is input for a single unit time. Candidate intermediate results of the speech recognition with respect to an accumulated signal of the sound signal input thus far at a point in time of each unit time may be illustrated. Here, a vertical axis denotes a speech matching degree of correspondence to the candidate intermediate results. A candidate disposed at an uppermost position, excluding a candidate marked with "X," may have a highest degree of correspondence at a point in time of each unit time. The candidate with a highest degree of correspondence may be displayed to the user as an intermediate result of the speech recognition at a corresponding point in time. In this instance, in addition to the candidate with the highest degree of correspondence, an N number of subsequent top candidates may be displayed to the user.

In particular, the graph 500 shows that "9 (GU)", "쿠 (KO)", "구 (GU)", and "G" (phonetic symbols followed by pronunciation in parenthesis) correspond to words with a high degree of correspondence as intermediate results of the speech recognition with respect to a first unit time. Since "9 (GU)" has the highest degree of correspondence, "9 (GU)" may be displayed to the user. With respect to a second unit time, since a word corresponding to a combination of "9 (GU)" and "스 (S)" is not determined to be a proper word, a word starting with "9 (GU)" may be excluded from candidates, and "코스 (KOS)", "구스 (GUS)", and "GOOSE" may become upper candidates. Among the upper candidates, "코스 (KOS)" has the highest degree of correspondence and thus, may be displayed to the user. With respect to a third unit time, "코스닥 (KOSDAQ)", "구스타 (GUSTA)", and "GOOSTER" may become candidates. Since "코스닥 (KOSDAQ)" has the highest degree of correspondence and thus, may be displayed to the user. With respect to a fourth unit time, since "코스닥 (KOSDAQ)" may be followed by a word starting with "프 (P)", for example, "프로 (PRO)" or "프로야구 (PRO YAGU)", "코스닥프 (KOSDAQ P)" may become a candidate. In addition, since "구스타프 (GUSTAV)" has a meaning as a single word, "구스타프 (GUSTAV)" may become a candidate. At the time, a matching value of "코스닥 (KOSDAQ)", excluding "프 (P)", may be relatively high. Accordingly, "코스닥프 (KOSDAQ P)" may be displayed to the user. With respect to a last unit time, "구스타프 클림트 (GUSTAV KLIMT)" intended by the user may be displayed to the user as a final result of the speech recognition. In this instance, "코스닥 프로 (KOSDAQ PRO)" or "코스닥 프로야구 (KOSDAQ PRO YAGU[PRO BASEBALL])" predicted with respect to the previous unit time has a relatively low speech matching level with "구스타프 클림트 (GUSTAV KLIMT)" and thus, may be excluded from the candidates.

Although FIG. 5 illustrates an example of a single syllable being input at every unit time, the example is provided for each of description only and is not limited to such an input. Instead, a speech may not be input for a single unit time, or a speech corresponding to a portion of a single syllable may be input for a single unit time. In addition, a speech corresponding to a plurality of syllables may be input for a single unit time. Also, a unit time of a reference for transmitting a sound signal may differ from a unit time for generating and providing an intermediate result of speech recognition. For example, a unit sound signal input every 20 milliseconds between the aforementioned unit times may be transmitted from a speech recognition client system to a speech recognition server system. In addition, an intermediate result of the speech recognition may be generated every 500 milliseconds, and transmitted from the speech recognition server system to the speech recognition client system. In this instance, an initial intermediate result of the speech recognition may include results of the speech recognition with respect to 25 unit sound signals, and a second intermediate result of the speech recognition may include results of the speech recognition with respect to 50 unit sound signals.

Figure 6:
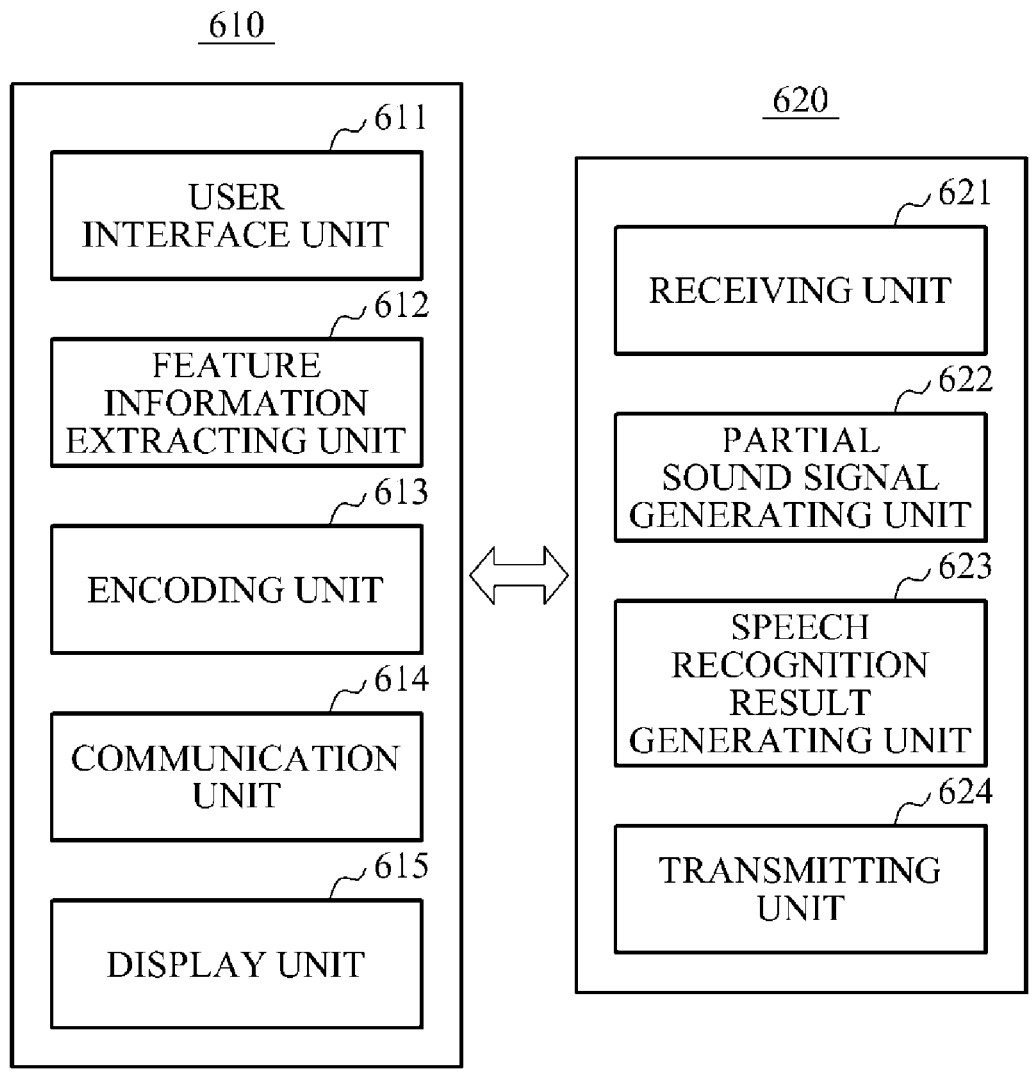
FIG. 6 is a block diagram illustrating an internal configuration of a speech recognition client system and an internal configuration of a speech recognition server system according to an exemplary embodiment of the present invention.

FIG. 6 is a block diagram illustrating an internal configuration of a speech recognition client system and an internal configuration of a speech recognition server system according to an exemplary embodiment of the present invention.

Referring to FIG. 6, a speech recognition client system 610 may include a user interface unit 611, a feature information extracting unit 612, an encoding unit 613, a communication unit 614, and a display unit 615. In this instance, the user interface unit 611, the feature information extracting unit 612, and the encoding unit 613 may be included in the speech recognition client system 610 optionally as necessary.

As shown in FIG. 6, a speech recognition server system 620 may include a receiving unit 621, a partial sound signal generating unit 622, a speech recognition result generating unit 623, and a transmitting unit 624. In this instance, the receiving unit 621, and the partial sound signal generating unit 622 may be included in the speech recognition server system 620 optionally as necessary.

In the speech recognition client system 610, the user interface unit 611 may receive an input of an event from a user. The event may include an event to be used for initiating speech recognition, or an event to be used for selecting one of intermediate results of speech recognition including at least to results.

The feature information extracting unit 612 may extract feature information from an input unit sound signal.

The encoding unit 613 may encode the input unit sound signal.

In this instance, the unit sound signal may include sound signals input at intervals of a predetermined unit time starting from a starting time until an ending time of the speech recognition.

The communication unit 614 may transmit the unit sound signal to the speech recognition server system 620 at intervals of a unit time, and receive an intermediate result of the speech recognition from the speech recognition server system 620. In this instance, the communication unit 614 may transmit, to the speech recognition server system 620, the feature information extracted by the feature information extracting unit 612 and the unit sound signal encoded by the encoding unit 613 at intervals of the unit time.

In addition, the intermediate result of the speech recognition may be generated using a partial sound signal generated by accumulating at least one unit sound signal based on an input time, in the speech recognition server system 620. For example, when the speech recognition client system 610 transmits a unit sound signal every 20 milliseconds, and the speech recognitions server system 620 generates and transmits an intermediate result of speech recognition every 500 milliseconds, the speech recognition server system 620 may generate the intermediate result of the speech recognition using a partial sound signal generated by accumulating first twenty-five unit sound signals. In order to generate a second intermediate result of the speech recognition, a partial sound signal generated by accumulating a total of fifty unit sound signals corresponding to the first twenty-five unit sound signals and subsequently received twenty-five unit sound signals.

The display unit 615 may display the received intermediate result of the speech recognition between the starting time and the ending time of the speech recognition. As an example, when a plurality of intermediate results of the speech recognition is received from the speech recognition server system 620, the display unit 615 may sequentially display the plurality of intermediate results of the speech recognition between the starting time and the ending time. For example, when "자 (JA [ALL])" (phonetic symbols followed by pronunciation in parenthesis) is received as a first intermediate result of speech recognition, "자동 (JADONG [AUTO])" is received as a second intermediate result of the speech recognition, and "자동차 (JADONGCHA [AUTOMOBILE])" is received as a third intermediate result of the speech recognition, the display unit 615 may sequentially display "자 (JA [ALL])", "자동 (JADONG [AUTO])", and "자동차 (JADONGCHA [AUTOMOBILE])" between the starting time and the ending time.

In this instance, the speech recognition client system 610 may further include a user interface unit (not shown) configured to receive, from the user, an input of an event for determining the ending time of the speech recognition. In this instance, a final result of the speech recognition may be generated using unit sound signals input before the event is input. In particular, the speech recognition client system 610 may report that the speech recognition is terminated to the speech recognition server system 620, and generate an intermediate result of the speech recognition received last as a final result or control a final result of the speech recognition to be generated using unit sound signals input until the speech recognition is terminated.

In the speech recognition server system 620, the receiving unit 621 may receive a unit sound signal input into the speech recognition client system 610 at intervals of a unit time starting from the starting time until the ending time of the speech recognition.

The partial sound signal generating unit 622 may generate a partial sound signal by accumulating a predetermined number of unit sound signals transmitted from the speech recognition client system 610 at interval of the unit time.

The speech recognition result generating unit 623 may generate an intermediate result of the speech recognition, using the partial sound signal generated by the partial sound signal generating unit 622. In particular, the speech recognition result generating unit 623 may generate the intermediate result of the speech recognition using at least one unit sound signal input thus far while the user is speaking through the speech recognition client system 610. Basically, the speech recognition result generating unit 623 may generate the intermediate result of the speech recognition with respect to the generated partial sound signal whenever the partial sound signal is generated.

The transmitting unit 624 may transmit the intermediate result of the speech recognition to the speech recognition client system 610. In this instance, the transmitting unit 624 may transmit a single intermediate result with a highest degree of correspondence to the speech recognition client system 610. In this example, the speech recognition server system 620 may manage all candidate intermediate results since a most proper result may be changed when a more amount of speech is input in the future. For example, when "9 (GU)", "코 (KO)", "구 (GU)", and "G" (phonetic symbols followed by pronunciation in parenthesis) are candidates, "9 (GU)" may be transmitted to the speech recognition client system 610, and the remaining candidates may be retained in the speech recognition server system 620, rather than being deleted, and matching levels of the candidates may be continuously calculated using a speech to be input later.

In addition, the speech recognition server system 620 may transmit a plurality of intermediate results of the speech recognition, other than a single intermediate result, to the speech recognition client system 610. In this instance, the speech recognition server system 620 may further include an accuracy determining unit (not shown) to determine respective accuracies of at least two results. In particular, the transmitting unit 624 may transmit, to the speech recognition client system 610, one of an intermediate result of the speech recognition including the at least two results displayed in an order of accuracy, an intermediate result of the speech recognition including the at least two results and the respective accuracies of the at least two results, and an intermediate result of the speech recognition including a result with a highest accuracy. For example, with respect to two results of "코스닥 (KOSDAQ)" (phonetic symbols followed by pronunciation in parenthesis) and "구스타 (GUSTA)", an accuracy of "구스타 (GUSTA)" may correspond to "5" which is higher than an accuracy of "코스닥 (KOSDAQ)" corresponding to "3." In this instance, the transmitting unit 624 may transmit an intermediate result of the speech recognition including the two results displayed in an order of "구스타 (GUSTA)" and "코스닥 (KOSDAQ)", an intermediate result of the speech recognition including respective accuracies, for example, "구스타 (GUSTA)-5", and "코스닥 (KOSDAQ)-3", or an intermediate result of the speech recognition including only "구스타 (GUSTA)" having a highest accuracy. Here, "-" denotes a symbol indicating that a following number corresponds to an accuracy. However, the symbol "-" is provided arbitrarily, and the accuracy may be transmitted to the speech recognition client system 610 using various methods.

Figure 7:
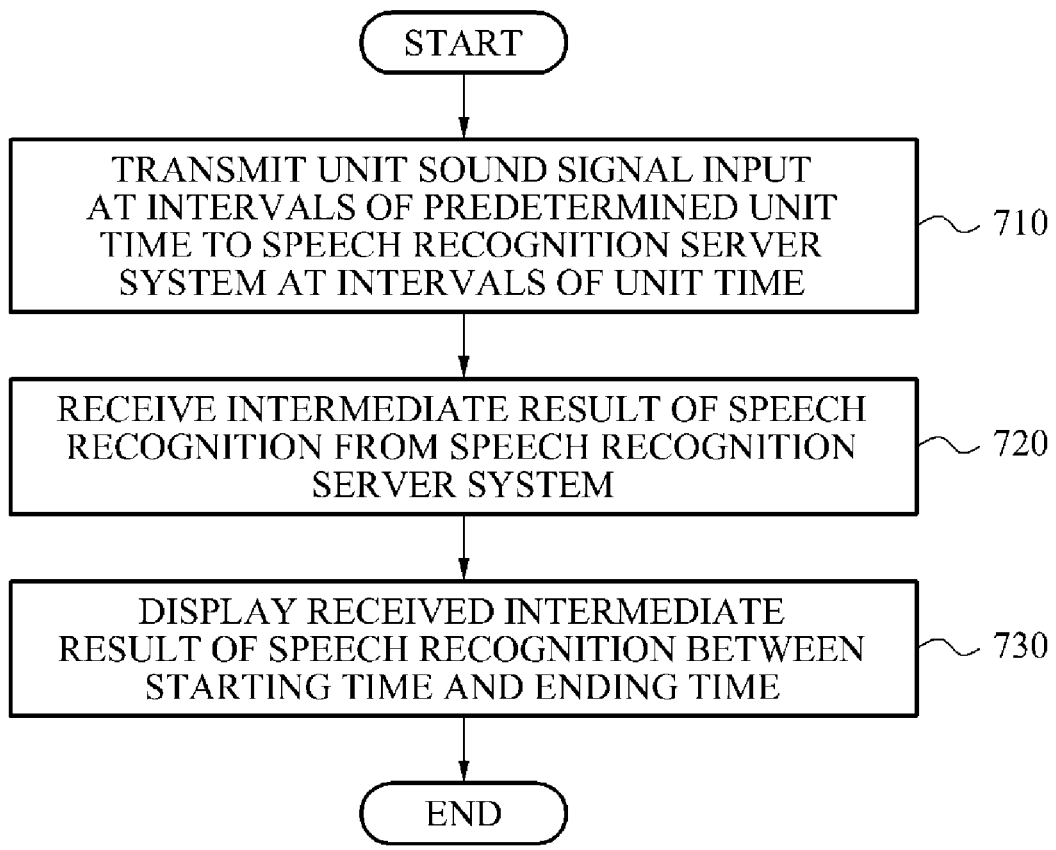
FIG. 7 is a flowchart illustrating a method of speech recognition performed by a speech recognition client system according to an exemplary embodiment of the present invention.

FIG. 7 is a flowchart illustrating a method of speech recognition performed by a speech recognition client system according to an exemplary embodiment of the present invention. The speech recognition method may be performed by the speech recognition client system 610 of FIG. 6. In FIG. 7, the speech recognition method may be described by describing a process of performing operations by the speech recognition client system 610.

In operation 710, the speech recognition client system 610 may transmit, to a speech recognition server system, a unit sound signal input at intervals of a predetermined unit time starting from a starting time until an ending time of speech recognition, at intervals of a unit time. The speech recognition client system 610 may extract feature information from the unit sound signal input for another unit time with respect to a sound signal input through an interface, for example, a microphone, and encode the input unit sound signal. In this instance, the speech recognition client system 610 may transmit, to the speech recognition server system, the extracted feature information and the encoded unit sound signal at intervals of the unit time. Here, the speech recognition server system may correspond to the speech recognition server system 620 of FIG. 6.

In operation 720, the speech recognition client system 610 may receive an intermediate result of the speech recognition from the speech recognition server system. Here, the intermediate result of the speech recognition may be generated using a partial sound signal generated by accumulating at least one unit sound signal based on an input time, in the speech recognition server system. For example, when the speech recognition client system 610 transmits a unit sound signal every 20 milliseconds, and the speech recognition server system generated and transmits an intermediate result of speech recognition every 500 milliseconds, the speech recognitions server system may generate the intermediate result of the speech recognition using a partial sound signal generated by accumulating first twenty-five unit sound signals. In order to generate a second intermediate result of the speech recognition, a partial sound signal generated by accumulating a total of fifty unit sound signals corresponding to the first twenty-five unit sound signals and subsequently received twenty-five unit sound signals.

In operation 730, the speech recognition client system 610 may display the received intermediate result of the speech recognition between the starting time and the ending time of the speech recognition. As an example, when a plurality of intermediate results of the speech recognition is received from the speech recognition server system, the speech recognition client system 610 may sequentially display the plurality of intermediate results of the speech recognition between the starting time and the ending time. For example, when "자 (JA [ALL])" (phonetic symbols followed by pronunciation in parenthesis) is received as a first intermediate result of speech recognition, "자동 (JADONG [AUTO])" is received as a second intermediate result of the speech recognition, and "자동차 (JADONGCHA [AUTOMOBILE])" is received as a third intermediate result of the speech recognition, the speech recognition client system 610 may sequentially display "자 (JA [ALL])", "자동 (JADONG [AUTO])", and "자동차 (JADONGCHA [AUTOMOBILE])" between the starting time and the ending time.

In addition, each intermediate result of the speech recognition may include a single result, or at least two results. For example, when a user who wants to obtain a result of speech recognition corresponding to "구스타프 클림트 (GUSTAV KLIMT)" (phonetic symbols followed by pronunciation in parenthesis) says "구 (GU)", "9 (GU)", "구 (GU)", "코 (KO)", "G", and the like may be provided to the speech recognition client system 610 as intermediate results of the speech recognition with respect to "구 (GU)". In this instance, a matching level of each candidate may be provided together, whereby the speech recognition client system 610 may display the intermediate results based on the matching value, or display a candidate with a highest matching value.

In this instance, the speech recognition client system 610 may further perform receiving, from the user, an input of an event for determining the ending time of the speech recognition. In this instance, a final result of the speech recognition may be generated using unit sound signals input before the event is input. In particular, the speech recognition client system 610 may report that the speech recognition is terminated to the speech recognition server system 620, and generate an intermediate result of the speech recognition received last as a final result or control a final result of the speech recognition to be generated using unit sound signals input until the speech recognition is terminated.

Figure 8:
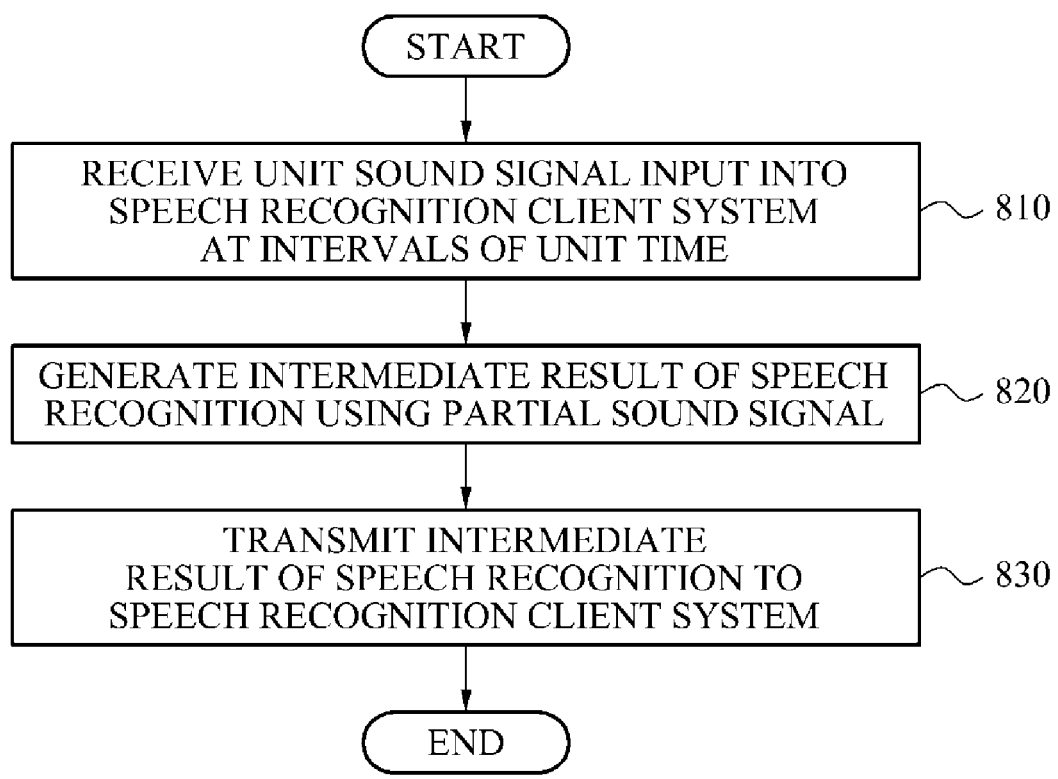
FIG. 8 is a flowchart illustrating a method of speech recognition performed by a speech recognition server system according to an exemplary embodiment of the present invention.

FIG. 8 is a flowchart illustrating a method of speech recognition performed by a speech recognition server system according to an exemplary embodiment of the present invention. The speech recognition method may be performed by the speech recognition server system 620 of FIG. 6. In FIG. 8, the speech recognition method may be described by describing a process of performing operations by the speech recognition server system 620.

In operation 810, the speech recognition server system 620 may receive a unit sound signal input into a speech recognition client system at intervals of a unit time starting from the starting time until the ending time of the speech recognition. Here, the speech recognition client system may correspond to the speech recognition client system 610 of FIG. 6.

In operation 820, the speech recognition server system 620 may generate an intermediate result of the speech recognition, using a partial sound signal generated by accumulating at least one unit sound signal based on an input time. In particular, the speech recognition server system 620 may generate the intermediate result of the speech recognition using at least one unit sound signal input thus far while the user is speaking through the speech recognition client system 610. In particular, the speech recognition server system 620 may generate the intermediate result of the speech recognition with respect to the generated partial sound signal whenever the partial sound signal is generated. Here, the partial sound signal may be generated by accumulating a predetermined number of unit sound signals transmitted from the speech recognition client system.

In operation 830, the speech recognition server system 620 may transmit the intermediate result of the speech recognition to the speech recognition client system. In this instance, when a single intermediate result of the speech recognition includes at least two results, the speech recognition server system 620 may transmit the single intermediate result of the speech recognition including all of the at least two results to the speech recognition client system. For example, although the single intermediate result of the speech recognition includes four results, for example, "9 (GU)", "코 (KO)", "구 (GU)", and "G," (phonetic symbols followed by pronunciation in parenthesis) the speech recognition server system 620 may transmit the four results as the single intermediate result of the speech recognition to the speech recognition client system.

In addition, the speech recognition server system 620 may determine respective accuracies of at least two results when the at least two results are included in a single intermediate result of the speech recognition. In this instance, the speech recognition server system 620 may transmit, to the speech recognition client system, one of an intermediate result of the speech recognition including the at least two results displayed in an order of accuracy, an intermediate result of the speech recognition including the at least two results and the respective accuracies of the at least two results, and an intermediate result of the speech recognition including a result with a highest accuracy. For example, with respect to two results of "코스닥 (KOSDAQ)" (phonetic symbols followed by pronunciation in parenthesis) and "구스타 (GUSTA)", an accuracy of "구스타 (GUSTA)" may correspond to "5" which is higher than an accuracy of "코스닥 (KOSDAQ)" corresponding to "3." In this instance, the speech recognition server system 620 may transmit an intermediate result of the speech recognition including the two results displayed in an order of "구스타 (GUSTA)" and "코스닥 (KOSDAQ)", an intermediate result of the speech recognition including respective accuracies, for example, "구스타 (GUSTA)-5", and "코스닥 (KOSDAQ)-3", or an intermediate result of the speech recognition including only "구스타 (GUSTA)" having a highest accuracy. Here, "-" denotes a symbol indicating that a following number corresponds to an accuracy. However, the symbol "-" is provided arbitrarily, and the accuracy may be transmitted to the speech recognition client system using various methods.

Figure 9:
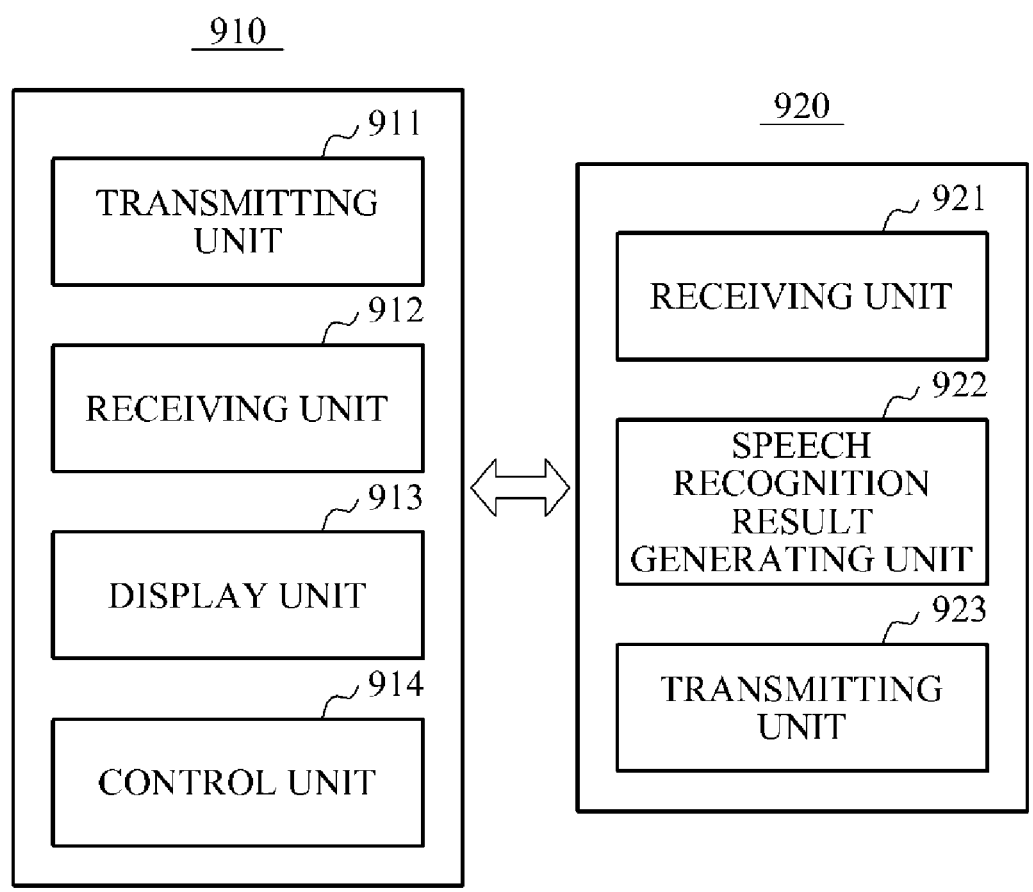
FIG. 9 is a block diagram illustrating an internal configuration of a speech recognition client system and an internal configuration of a speech recognition server system according to another exemplary embodiment of the present invention.

FIG. 9 is a block diagram illustrating an internal configuration of a speech recognition client system and an internal configuration of a speech recognition server system according to another exemplary embodiment of the present invention.

Referring to FIG. 9, a speech recognition client system 610 may include a transmitting unit 911, a receiving unit 912, a display unit 913, and a control unit 914. In this instance, the transmitting unit 911, the receiving unit 912, and the display unit 913 may be included in the speech recognition client system 910, as necessary. For example, the speech recognition client system 910 may include only the control unit 914 to control the transmitting unit 911, the receiving unit 912, and the display unit 913 of a terminal to perform speech recognition.

As shown in FIG. 9, a speech recognition server system 920 may include a receiving unit 921, a speech recognition result generating unit 922, and a transmitting unit 923.

As an example, in the speech recognition client system 910, the transmitting unit 911 may transmit, to the speech recognition server system 920, a unit sound signal input at intervals of a predetermined unit time. The receiving unit 912 may receive an intermediate result of speech recognition from the speech recognition server system 920. The display unit 913 may display the received intermediate result of the speech recognition between a starting time and an ending time of the speech recognition. Here, the intermediate result of the speech recognition may be generated using a partial sound signal generated by accumulating at least one of transmitted unit sound signals based on an input time. The partial sound signal may include a signal generated by accumulating at least one unit sound signal based on an input time, and the unit sound signal may include a sound signal input at intervals of a unit time starting from the starting time.

As another example, in the speech recognition client system 910, the transmitting unit 911 may transmit, to the speech recognition server system 920, a partial sound signal generated by accumulating unit sound signals input at intervals of a unit time starting from a starting time, based on an input time. The receiving unit 912 may receive, from the speech recognition server system 920, an intermediate result of speech recognition generated using the partial sound signal. In addition, the display unit 913 may display the received intermediate result of the speech recognition between the starting time and an ending time of the speech recognition.

In particular, the speech recognition client system 910 may transmit, to the speech recognition server system 920, unit sound signals input at intervals of a unit time for another unit time, or transmit, to the speech recognition server system 920, a partial sound signal generated by accumulating a predetermined number of unit sound signals based on an input time.

In the former example, the speech recognition server system 920 may generate a partial sound signal using unit sound signals, and generate an intermediate result of the speech recognition using the generated partial sound signal. For example, when sound signals corresponding to "구 (GU)", "스 (S)", "타 (TA)", and "프 (V)" (phonetic symbols followed by pronunciation in parenthesis) are input for four respective unit times, the speech recognition client system 910 may transmit "구 (GU)", "스 (S)", "타 (TA)", and "프 (V)" at respective unit times. In this instance, the speech recognition client system 920 may generate partial sound signals, for example, "구 (GU)", "구스 (GUS)", "구스타 (GUSTA)", and "구스타프 (GUSTAV)", by accumulating unit sound signals, and generate an intermediate result of the speech recognition with respect to each partial sound signal.

In the latter example, the speech recognition client system 910 may transmit, to the speech recognition server system 920, a partial sound signal generated by accumulating at least one unit sound signal, and the speech recognition server system 920 may generate an intermediate result of the speech recognition simply using the received partial sound signal. For example, when sound signals corresponding to "구 (GU)", "스 (S)", "타 (TA)", and "프 (V)" (phonetic symbols followed by pronunciation in parenthesis) are input for four respective unit times, the speech recognition client system 910 may transmit partial sound signals, for example, "구 (GU)", "구스 (GUS)", "구스타 (GUSTA)", and "구스타프 (GUSTAV)", generated by accumulating unit sound signals, at each unit time. In this instance, the speech recognition client system 920 may generate an intermediate result of the speech recognition using the received partial sound signals, for example, "구 (GU)", "구스 (GUS)", "구스타 (GUSTA)", and "구스타프 (GUSTAV)".

The control unit 914 may control an intermediate result of the speech recognition with respect to a partial sound signal input starting from the starting time until at least one of a plurality of points in time between the starting time and the ending time, to be displayed between the starting time and the ending time. In this instance, the control unit 914 may control the transmitting unit 911, the receiving unit 912, and the display unit 913 to display the intermediate result of the speech recognition between the starting time and the ending time.

In this instance, when at least two results are included in a single intermediate result of the speech recognition, the control unit 914 may control all of the at least two results to be displayed. In this example, as described above, the speech recognition client system 910 may transmit a result selected through an event input by a user to the speech recognition server system 920, and the selected result may be reflected in generation of a subsequent intermediate result of the speech recognition, or in generation of a final result of the speech recognition.

As another example, the speech recognition client system 910 may further include an accuracy determining unit (not shown) to determine respective accuracies of at least two results when the at least two results are included in a single intermediate result of speech recognition. In this instance, the control unit 914 may control the at least two results to be displayed in an order of accuracy, or control a result with a highest accuracy to be displayed.

In addition, when a plurality of intermediate results of the speech recognition is received from the speech recognition server system 920, the control unit 914 may control the plurality of intermediate results of the speech recognition to be displayed sequentially between the starting time and the ending time.

In this instance, the speech recognition client system 910 may further include a user interface unit (not shown) configured to receive, from the user, an input of an event for determining the ending time of the speech recognition. In this instance, a final result of the speech recognition may be generated using unit sound signals input before the event is input. In particular, the speech recognition client system 610 may report that the speech recognition is terminated to the speech recognition server system 620, and generate an intermediate result of the speech recognition received last as a final result or control a final result of the speech recognition to be generated using unit sound signals input until the speech recognition is terminated.

In the speech recognition server system 920, the receiving unit 921 may receive, from the speech recognition client system 910, unit sound signals input into the speech recognition client system 910 at intervals of a predetermined unit time, or a partial sound signal generated by accumulating, based on an input time, at least one of unit sound signals input into the speech recognition client system 910 at intervals of the predetermined unit time.

The speech recognition result generating unit 922 may generate an intermediate result of the speech recognition using a partial sound signal input into the speech recognition client system 910 starting from a starting time of the speech recognition until at least one of a plurality of points of view between the starting time and an ending time. In particular, when the receiving unit 921 receives a unit sound signal, the speech recognition result generating unit 922 may directly generate a partial sound signal using the unit sound signal. When the receiving unit 921 receives a partial sound signal, the speech recognition result generating unit 922 may generate an intermediate result of the speech recognition using the received partial sound signal.

The transmitting unit 923 may transmit the intermediate result of the speech recognition to the speech recognition client system 910. In this instance, the intermediate result of the speech recognition may be displayed between the starting time and the ending time through the display unit 913 of the speech recognition client system 910.

A speech recognition method performed by the speech recognition client system 910 may include a first operation (not shown) of controlling an intermediate result of speech recognition with respect to a partial sound signal input starting from a starting time of the speech recognition until at least one of a plurality of points of time between the starting time and an ending time to be displayed between the starting time and the ending time. In this instance, the speech recognition client system 910 may perform the speech recognition method, by incorporating, into the first operation, a second operation (not shown) of controlling a unit sound signal input at intervals of a predetermined unit time to be transmitted to the speech recognition server system 920, a third operation (not shown) of controlling an intermediate result of the speech recognition to be received from the speech recognition server system 920, and a fourth operation (not shown) of controlling the received intermediate result of the speech recognition to be displayed between the starting time and the ending time.

As another example, the speech recognition client system 910 may perform the speech recognition method, by incorporating, into the first operation, a second operation of controlling a partial sound signal generated by accumulating, based on an input time, unit sound signals input at intervals of a unit time starting from a starting time, to be transmitted to the speech recognition server system 920, a third operation of controlling an intermediate result of the speech recognition generated using the partial sound signal to be received from the speech recognition server system 920, and a fourth operation of controlling the received intermediate result of the speech recognition to be displayed between the starting time and an ending time.

In this instance, the speech recognition client system 910 may further perform an operation (not shown) of receiving, from a user, an input of an event for determining the ending time of the speech recognition. In this example, a final result of the speech recognition may be generated using unit sound signals input before the event is input. In particular, the speech recognition client system 910 may report that the speech recognition is terminated to the speech recognition server system 920, and generate an intermediate result of the speech recognition received last as a final result or control a final result of the speech recognition to be generated using unit sound signals input until the speech recognition is terminated.

In addition, a speech recognition method performed by the speech recognition server system 920 may include a first operation (not shown) of receiving, from the speech recognition client system 910, unit sound signals input into the speech recognition client system 910 at intervals of a predetermined unit time, or a partial sound signal generated by accumulating, based on an input time, at least one of unit sound signals input into the speech recognition client system 910 at intervals of the predetermined unit time, a second operation (not shown) of generating an intermediate result of the speech recognition using a partial sound signal input into the speech recognition client system 910 starting from a starting time of the speech recognition until at least one of a plurality of points of view between the starting time and an ending time, and a third operation (not shown) of transmitting the intermediate result of the speech recognition to the speech recognition client system 910. In particular, when a unit sound signal is received, the speech recognition server system 920 may directly generate a partial sound signal using the unit sound signal. When a partial sound signal is received, the speech recognition server system 920 may generate an intermediate result of the speech recognition using the received partial sound signal. In this instance, the intermediate result of the speech recognition may be displayed between the starting time and the ending time through the display unit 913 of the speech recognition client system 910.

As described above, when the system and the method according to exemplary embodiments of the present invention are used, by providing a user with an intermediate result of speech recognition after the user starts speaking and before the speech recognition is terminated, it is possible to reduce an anxiety of the user about whether the speech recognition is performed accurately. In addition, by generating a partial sound signal by accumulating at least one unit sound signal input at intervals of a predetermined unit time after the user starts speaking, generating an intermediate result of the speech recognition based on the partial sound signal, and providing the intermediate result of the speech recognition to the user, it is possible to reassure the user and show a processing process of the speech recognition.

The above-described methods according to the exemplary embodiments of the present invention may be recorded in non-transitory computer-readable media including program instructions to implement various operations embodied by a computer. The non-transitory computer-readable media may also include, alone or in combination with the program instructions, data files, data structures, and the like. The media and program instructions may be those specially designed and constructed for the purposes of the present invention, or they may be of the kind well-known and available to those having skill in the computer software arts. In addition, a file system may be recorded in the non-transitory computer-readable media.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Accordingly, the invention is not limited to such embodiments, but rather to the broader scope of the presented claims and various obvious modifications and equivalent arrangements.

The invention claimed is:

1. A speech recognition client system for recognizing speech in a sound signal, the sound signal being input into the speech recognition client system starting from a starting time and ending at an ending time, the speech recognition client system comprising:
   a communication unit configured to transmit, to a speech recognition server system, the sound signal as a plurality of sound signal units of a predetermined length, each sound signal unit of the plurality of sound signal units being transmitted to the speech recognition server system at intervals of a first predetermined unit time starting from the starting time and ending at the ending time, and configured to receive at least one intermediate result, from the speech recognition server system, at intervals of a second predetermined unit time; and
   a display unit configured to display, at a display time corresponding to a time between the starting time and the ending time, the received at least one intermediate result,
   wherein the at least one intermediate result is generated, by the speech recognition server system, by accumulating at least one of the plurality of sound signal units received by the speech recognition server system within the second predetermined unit time.

2. The speech recognition client system of claim 1, wherein, when a plurality of intermediate results are included in the at least one intermediate result, the display unit is configured to sequentially display, at the display time, the plurality of intermediate results.

3. The speech recognition client system of claim 1, wherein, when at least two intermediate results are included in the at least one intermediate result, the display unit is configured to receive and display all of the at least two intermediate results.

4. The speech recognition client system of claim 1, wherein, when at least two intermediate results are included in the at least one intermediate result, the display unit is configured to display the at least two intermediate results in an order of accuracy, or to display an intermediate result with a highest accuracy.

5. The speech recognition client system of claim 1, further comprising:
   a feature information extracting unit configured to extract feature information from the sound signal; and
   an encoding unit configured to encode the extracted feature information,
   wherein the communication unit is configured to transmit, to the speech recognition server system, the extracted feature information and the encoded extracted feature information as one of the plurality of sound signal units.

6. The speech recognition client system of claim 1, further comprising:
   a user interface unit configured to receive, from a user, an input of a termination event,
   wherein the ending time is set when the user interface unit receives the input of the termination event,
   wherein a final speech recognition result is generated using the sound signal that is input into the speech recognition client system before the input of the termination event.

7. A speech recognition server system for generating a speech recognition result from a sound signal, the sound signal being input into a speech recognition client system, the speech recognition server system comprising:
   a receiving unit configured to receive the sound signal, from the speech recognition client system, as a plurality of sound signal units of a predetermined length, each sound signal unit of the plurality of sound signal units being input, from the speech recognition client system, at intervals of a first predetermined unit time starting from a starting time and ending at an ending time;
   a speech recognition result generating unit configured to generate at least one intermediate result, using a partial sound signal generated by accumulating at least one of the plurality of sound signal units received by the receiving unit within a second predetermined unit time; and
   a transmitting unit configured to transmit the at least one intermediate result to the speech recognition client system at intervals of the second predetermined unit time,
   wherein the at least one intermediate result is displayed at a display time corresponding to a time between the starting time and the ending time.

8. The speech recognition server system of claim 7, further comprising:
   a partial sound signal generating unit configured to generate the partial sound signal by accumulating the at least one of the plurality of sound signal units.

9. The speech recognition server system of claim 7, wherein, when at least two intermediate results are included in the at least one intermediate result, the transmitting unit is configured to transmit, to the speech recognition client system, the at least two intermediate results.

10. The speech recognition server system of claim 7, further comprising:
an accuracy determining unit configured to determine respective accuracies of at least two intermediate results, when the at least two intermediate results are included in the at least one intermediate result,
wherein, when the at least two intermediate results are included in the at least one intermediate result, the transmitting unit is configured to transmit the at least two intermediate results to the speech recognition client system, the speech recognition client system being configured to display the at least two intermediate results in an order of accuracy, or to display an intermediate result with a highest accuracy.

11. A computer-implemented speech recognition method, the speech recognition method comprising:
transmitting, to a speech recognition server system, a sound signal as a plurality of sound signal units of predetermined length, each sound signal unit of the plurality of sound signal units being transmitted at intervals of a first predetermined unit time starting from a starting time and ending at an ending time, and receiving at least one intermediate result from the speech recognition server system at intervals of a second predetermined unit time; and
displaying, with a computer, the received at least one intermediate result at a display time, corresponding to a time between the starting time and the ending time;
wherein the at least one intermediate result is generated, by the speech recognition server system, by accumulating at least one of the plurality of sound signal units received within the second predetermined unit time.

12. A computer-implemented speech recognition method of generating a speech recognition result from a sound signal, the sound signal being received from a speech recognition client system, the speech recognition method comprising:
receiving, with a computer, the sound signal as a plurality of sound signal units of a predetermined length, each sound signal unit of the plurality of sound signal units being received, from the speech recognition client system, at intervals of a first predetermined unit time starting from a starting time and ending at an ending time;
generating, with the computer, at least one intermediate result using a partial sound signal generated by accumulating at least one of the plurality of sound signal units received within a second predetermined unit time; and
transmitting the at least one intermediate result to the speech recognition client system at intervals of the second predetermined unit time,
wherein the at least one intermediate result is displayed at a display time corresponding to a time between a starting time and an ending time of the sound signal.

13. A non-transitory computer-readable medium storing a program for generating a speech recognition result from a sound signal received from a speech recognition client system, said program, when executed by a computer, causing the computer to perform steps comprising:
receiving the sound signal as a plurality of sound signal units of a predetermined length, each sound signal unit of the plurality of sound signal units being received, from the speech recognition client system, at intervals of a first predetermined unit time starting from a starting time and ending at an ending time;
generating at least one intermediate result using a partial sound signal generated by accumulating at least one of the plurality of sound signal units received within a second predetermined unit time; and
transmitting the at least one intermediate result to the speech recognition client system at intervals of the second predetermined unit time,
wherein the at least one intermediate result is displayed at a display time corresponding to a time between a starting time and an ending time of the sound signal.

* * * * *